(12) United States Patent
Hong

(10) Patent No.: US 9,810,914 B2
(45) Date of Patent: Nov. 7, 2017

(54) LIQUID CRYSTAL LENS PANEL AND DISPLAY DEVICE INCLUDING THE SAME

(71) Applicant: SAMSUNG DISPLAY CO., LTD., Yongin, Gyeonggi-Do (KR)

(72) Inventor: Sung Hwan Hong, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 94 days.

(21) Appl. No.: 14/719,423

(22) Filed: May 22, 2015

(65) Prior Publication Data
US 2016/0202493 A1    Jul. 14, 2016

(30) Foreign Application Priority Data

Jan. 8, 2015  (KR) .................. 10-2015-0002817

(51) Int. Cl.
| | | |
|---|---|---|
| *G02F 1/137* | (2006.01) | |
| *G02B 27/22* | (2006.01) | |
| *G02F 1/29* | (2006.01) | |
| *G02F 1/1343* | (2006.01) | |

(52) U.S. Cl.
CPC ....... *G02B 27/2242* (2013.01); *G02B 27/225* (2013.01); *G02F 1/13718* (2013.01); *G02F 1/29* (2013.01); *G02F 1/134309* (2013.01); *G02F 2001/294* (2013.01)

(58) Field of Classification Search
CPC ............... G02F 1/137; G02F 1/134309; G02F 1/13718; G02F 1/29; G02B 27/2242; G02B 27/225; G02B 349/15
USPC .......................................................... 349/15
See application file for complete search history.

(56) References Cited

U.S. PATENT DOCUMENTS

| | | | |
|---|---|---|---|
| 2001/0001567 A1* | 5/2001 | Lyu | ............... G02F 1/133707 349/143 |
| 2003/0063186 A1 | 4/2003 | Tomono | |
| 2007/0296911 A1 | 12/2007 | Hong | |
| 2011/0286063 A1 | 11/2011 | McGrew | |
| 2013/0063691 A1* | 3/2013 | Takama | ............... G02F 1/29 349/143 |

(Continued)

FOREIGN PATENT DOCUMENTS

| | | |
|---|---|---|
| KR | 1020090004006 | 1/2009 |
| KR | 1020090031722 | 3/2009 |

(Continued)

OTHER PUBLICATIONS

Hyung-Ki Hong, et al., 25.3: Autostereoscopic 2D/3D Switching Display Using Electric-Field-Driven LC Lens (ELC Lens), SID Symposium Digest of Technical Papers, vol. 39, Issue 1, p. 348-351, May 2008.

*Primary Examiner* — James Dudek
(74) *Attorney, Agent, or Firm* — F. Chau & Associates, LLC

(57) ABSTRACT

The liquid crystal lens includes a first substrate and a second substrate, a first common electrode disposed on the first substrate, a groove pattern disposed on the second substrate, where the plurality of electrode patterns face the first substrate, a plurality of electrode patterns disposed on the groove pattern, and a liquid crystal layer interposed between the first substrate and the second substrate, where the liquid crystal layer includes a uniformly lying helix type liquid crystal material. The liquid crystal lens may be included in a liquid crystal display device.

19 Claims, 12 Drawing Sheets

(56) References Cited

U.S. PATENT DOCUMENTS

2014/0307213 A1* 10/2014 Naganuma ........ G02F 1/133371
349/139

FOREIGN PATENT DOCUMENTS

| KR | 1020100013179 | 2/2010 |
|---|---|---|
| KR | 1020130010738 | 1/2013 |
| KR | 1020130091284 | 8/2013 |

* cited by examiner

ADJACENT LENS PORTION DIRECTION ←——→ CENTER DIRECTION

LIQUID CRYSTAL LENS PANEL AND DISPLAY DEVICE INCLUDING THE SAME

CROSS-REFERENCE TO RELATED APPLICATIONS

This application claims priority under 35 U.S.C. §119 from Korean Patent Application No. 10-2015-0002817 filed on Jan. 8, 2015 in the Korean Intellectual Property Office, and all the benefits accruing therefrom, the contents of which are herein incorporated by reference in their entirety.

BACKGROUND

1. Technical Field

Embodiments of the present disclosure are directed to a liquid crystal lens panel and a display device including the same, and more particularly to a liquid crystal lens panel having an improved display quality for an autostereoscopic type 3D image and a display device including the same.

2. Discussion of the Prior Art

In general, a 3D (Three-Dimensional) image display device shows a left-eye image and a right-eye image, which have binocular disparity, separately through a left eye and a right eye of an observer. The observer sees the left-eye image and the right-eye image through both eyes, and the observer's brain harmonizes these images, resulting in that the observer visually perceives a 3D effect.

To display a 3D stereoscopic image, a linear polarization type 3D image display device that separates an image into a left-eye image and a right-eye image using 3D glasses has been used. In this case, however, a viewer needs to wear the glasses, which may cause inconvenience in use.

SUMMARY

Exemplary embodiments of the present disclosure may provide a non-glasses type, autostereoscopic 3D image display device. An autostereoscopic 3D image display device may be classified as a barrier type, a lenticular type, or a liquid crystal lens panel type.

According to an autostereoscopic type 3D image display device, an observer can perceive a 3D image at a specific position or view point. However, if the observer moves to another position or view point, the observer may not be able to perceive an accurate 3D image.

Accordingly, an embodiment of the present disclosure can provide a liquid crystal lens panel that provides a multiview and an image display device including the same.

In an embodiment of the present disclosure, there is provided a liquid crystal lens comprising a first substrate and a second substrate; a first common electrode disposed on the first substrate; a groove pattern disposed on the second substrate, where the groove pattern faces the first substrate; a plurality of electrode patterns disposed on the groove pattern; and a liquid crystal layer interposed between the first substrate and the second substrate, wherein the liquid crystal layer includes a uniformly lying helix type liquid crystal material.

In another embodiment of the present disclosure, there is provided a display device comprising a display panel; and a liquid crystal lens disposed on the display panel, wherein the liquid crystal lens includes a first substrate and a second substrate; a first common electrode disposed on the first substrate; a groove pattern disposed on the second substrate, where the groove pattern faces the first substrate; a plurality of electrode patterns disposed on the groove pattern; and a liquid crystal layer interposed between the first substrate and the second substrate, wherein the liquid crystal layer includes a uniformly lying helix type liquid crystal material.

In another embodiment of the present disclosure, there is provided a liquid crystal lens comprising a first substrate and a second substrate; a first common electrode formed on the first substrate; a plurality of electrode patterns formed on the second substrate, wherein the plurality of electrode patterns face the first substrate; and a liquid crystal layer interposed between the first substrate and the second substrate, wherein the electrode patterns are grouped into a plurality of zones, wherein each zone comprises a plurality of adjacent electrode patterns, and a number of electrode patterns included in respective zones differs from each other.

A liquid crystal lens according to embodiments of the present disclosure can provide an autostereoscopic type multi view 3D image and a display device including the same.

DETAILED DESCRIPTION OF EXEMPLARY EMBODIMENTS

Embodiments of the present disclosure will now be described more fully hereinafter with reference to the accompanying drawings, in which exemplary embodiments of the disclosure are shown. This disclosure may, however, be embodied in different forms and should not be construed as limited to the embodiments set forth herein. The same reference numbers may indicate the same components throughout the specification. In the attached figures, the thickness of layers and regions may be exaggerated for clarity.

It will be understood that when an element or layer is referred to as being "connected to," or "coupled to" another element or layer, it can be directly connected to or coupled to another element or layer or intervening elements or layers may be present.

Hereinafter, embodiments of the present disclosure will be described with reference to the accompanying drawings.

Figure 1:
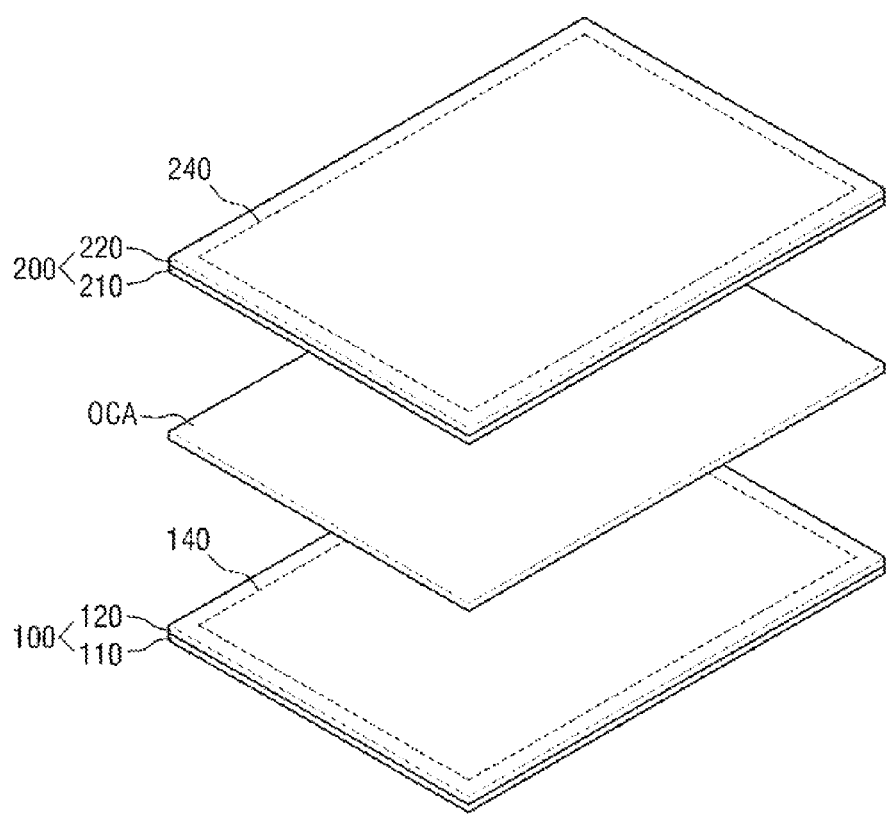
FIG. 1 is an exploded perspective view of a display device according to an embodiment of the present disclosure.
Figure 2:
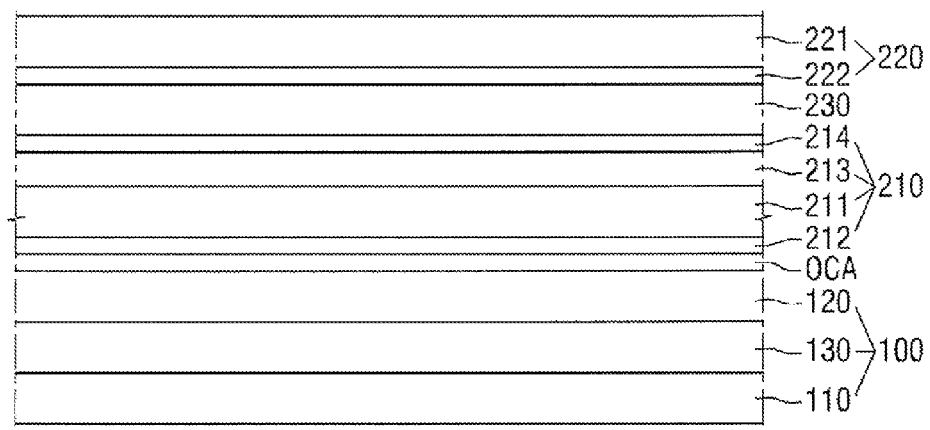
FIG. 2 is a partial cross-sectional view of a display panel and a liquid crystal lens panel of the display device of FIG. 1.

FIG. 1 is an exploded perspective view of a display device according to an embodiment of the present disclosure, and FIG. 2 is a partial cross-sectional view of a display panel 100 and a liquid crystal lens panel 200 of the display device of FIG. 1.

Referring to FIGS. 1 and 2, a display device according to an embodiment of the present disclosure may include a display panel 100 and a liquid crystal lens panel 200, and the display panel 100 and the liquid crystal lens panel 200 may be bonded together through a light-permeable adhesive member. For example, an optically clear adhesive (OCA) may be disposed between the display panel 100 and the liquid crystal lens panel 200 as the adhesive member, and thus the display panel 100 and the liquid crystal lens panel 200 may be bonded together. Here, the optically clear adhesive (OCA) includes optically clear adhesives.

The display panel 100 displays an image viewable by a viewer. Various types of display panels may be adopted as the display panel 100. For example, the display panel 100 may be a self-luminous display panel 100, such as an organic light emitting display (OLED) panel or a plasma display panel (PDP), or a non-luminous display panel 100, such as a liquid crystal display (LCD) panel, an electrophoretic display (EPD) panel, or an electrowetting display (EWD) panel. In the case of a non-luminous display panel 100, the display device may include a backlight unit that provides light to the display panel 100.

In the description, the LCD panel 100 is described as an exemplary display panel 100. However, embodiments of the present disclosure are not limited thereto, and as described above, other types of display panels 100 may be adopted as the display panel 100.

In an embodiment of the present disclosure, the display panel 100 may have a flat rectangular shape having 2 long sides and 2 short sides. The display panel 100 may include a display region 140 that displays an image and a non-display region that surrounds the display region. The display panel 100 may include an array substrate 110, an opposite substrate 120 that faces the array substrate 110, and a first liquid crystal layer 130 interposed between the array substrate 110 and the opposite substrate 120.

According to an embodiment of the present disclosure, the array substrate 110 may include a plurality of pixels arranged in a matrix form. A black matrix may be disposed in a region between the pixels to prevent interference of light emitted from the respective pixels, which may improve a contrast ratio of the display panel 100. Further, each of the pixels may include a gate line extending in a first direction parallel to the long side of the display device, a data line extending in a second direction that crosses the first direction and insulatively crossing the gate line, a pixel electrode disposed in a region where the gate line and the data line cross each other. Further, each of the pixels may be electrically connected to the gate line and the data line through a thin film transistor.

A driving integrated circuit (IC) may be provided on one side of the array substrate 110. The driving IC may receive an image signal and a control signal from an external source, and may provide a driving signal for driving the display panel 100 to the plurality of pixels in response to the received image signal and control signal.

The opposite substrate 120 may include an red-green-blue (RGB) color filter provided on one surface thereof to impart predetermined colors to light received from the backlight unit, and a common electrode on the RGB color filter to face the pixel electrode. Here, the RGB color filter may be formed through a thin film process. On the other hand, although an exemplary RGB color filter is described as being disposed on the opposite substrate 120, embodiments of the present disclosure are not limited thereto. For example, the color filer may be disposed on the array substrate 110 or on the respective pixel regions. Further, in some embodiments, the color filter may be omitted for a self-luminous display panel 100.

The molecules of the first liquid crystal layer 130 may align in a specific direction based on an electric field that is caused by a voltage difference between voltages that are applied to the pixel electrode and the common electrode, and may adjust transparency of the first liquid crystal layer 130 to light received from the backlight unit. Accordingly, the display panel 100 may display an image that corresponds to the image signal.

The liquid crystal lens panel 200 may convert the image of the display panel 100 into a 2D image or a 3D image. The liquid crystal lens panel 200 is disposed in a path of the light emitted from the display panel 100. The liquid crystal lens panel 200 may have a transparent region 240 that corresponds to the display region 140 of the display panel 100. Here, an image that is generated by the display region 140 may propagate through the transparent region 240. Further, the liquid crystal lens panel 200 may have a shape that corresponds to the display panel 100. That is, similar to the display panel 100, the liquid crystal lens panel 200 may have a flat rectangular shape having 2 short sides and 2 long sides.

The liquid crystal lens panel 200 may implement an optical function that separates the image received from the display panel 100 into a left-eye image and a right-eye image and transmits the separated images in different directions. FIG. 2 illustrates an exemplary liquid crystal lens panel 200 that functions as a virtual lenticular lens that can separate and transmit the image received from the display panel 100.

Specifically, the liquid crystal lens panel 200 may include a first substrate 210 disposed in a path of the light emitted from the display panel 100, a second substrate 220 facing the first substrate 210, and a second liquid crystal layer 230 interposed between the first substrate 210 and the second substrate 220.

The first substrate 210 may include a first base substrate 211, a groove pattern layer 213 disposed on one surface of the first base substrate 211, an alignment electrode layer 214 disposed on the groove pattern layer 213, and a lower common electrode 212 disposed on the other surface of the first base substrate 211.

The second substrate 220 may include a second base substrate 221, and an upper common electrode 222 disposed on the second base substrate 221.

The alignment electrode layer 214 may include a plurality of electrode patterns. Further, the upper common electrode 222, the lower common electrode 212, and the alignment electrode layer 214 may be made of a transparent conductive material, such as ITO (Indium Tin Oxide) or IZO (indium Zinc Oxide).

In addition, an alignment layer for aligning initial liquid crystals may be disposed on an upper portion of the alignment electrode layer 214 and a lower portion of the upper common electrode 222 to form cholesteric liquid crystals.

A common voltage may be applied to the upper common electrode 222 and the lower common electrode 212, and a voltage that is different from the common voltage may be applied to the plurality of electrode patterns of the alignment electrode layer 214. Accordingly, an electric field may be formed between the plurality of electrode patterns and the upper common electrode 222, and the second liquid crystal layer 230 interposed between the plurality of electrode patterns and the upper common electrode 222 may re-align to correspond to the formed electric field.

The second liquid crystal layer 230 includes a liquid crystal material aligned in a uniformly lying helix (ULH) structure. Specifically, the second liquid crystal layer 230 may include cholesteric liquid crystals that have a short pitch lie down in a direction parallel to the first substrate 210 and the second substrate 220, i.e., a structure in which the helical axes of cholesteric liquid crystals having a short pitch are aligned in one direction parallel to the first substrate 210 and the second substrate 220. The helical axes of the cholesteric liquid crystals may be equivalent to an optical axis of a birefringent plate. In general, a ULH structure may be implemented using chiral nematic liquid crystals that have a short pitch of typically about 200 to about 1000 nm or about 200 to about 500 nm.

In a ULH structure, if an electric field perpendicular to the first substrate 210 and the second substrate 220 is formed, the helical axes or the optical axes rotate on a plane of the first substrate 210 and the second substrate 220. This is distinguished from a state where the alignment state of the typical nematic liquid crystals or dielectrically anisotropic smectic liquid crystals is changed to a more stable energy state based on the electric field. Specifically, the optical axes of short pitch cholesteric liquid crystals aligned in the ULH structure tilt or rotate according to flexoelectric effects, which may be caused by splay-bend deformation of helically structured cholesteric liquid crystals. The tilt angle or rotation angle of the optical axis may vary linearly with respect to the strength of the vertical electric field. Further, visible light may pass through short pitch cholesteric liquid crystals, which are aligned in the ULH structure, and the degree of refraction of the light that passes through the liquid crystals may differ depending on the tilt angle or rotation angle of the cholesteric liquid crystals.

In an embodiment of the present disclosure, the helical axes of the short pitch cholesteric liquid crystals may rotate or tilt between the first direction and the second direction, which are parallel to the first substrate 210 and the second substrate 220. For example, when the same voltage is applied to the upper common electrode 222 and the plurality of electrode patterns and thus no electric field is formed, the helical axes of the short pitch cholesteric liquid crystals may align in the second direction, and as a difference between voltages applied to the upper common electrode 222 and the plurality of electrode patterns increases, the helical axes of the short pitch cholesteric liquid crystals may gradually rotate from the second direction to the first direction.

Figure 3:
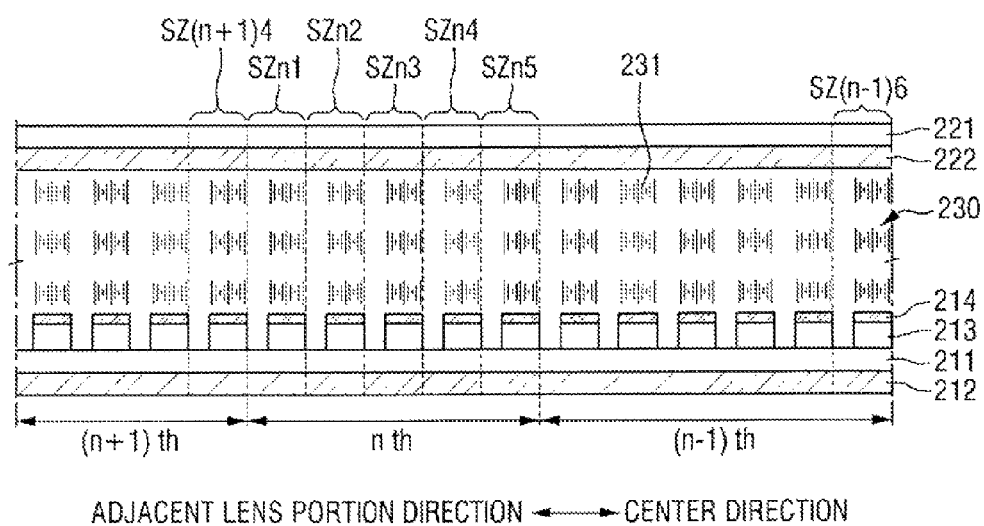
FIG. 3 is a partial cross-sectional view of a liquid crystal lens panel according to an embodiment of the present disclosure.
Figure 4:
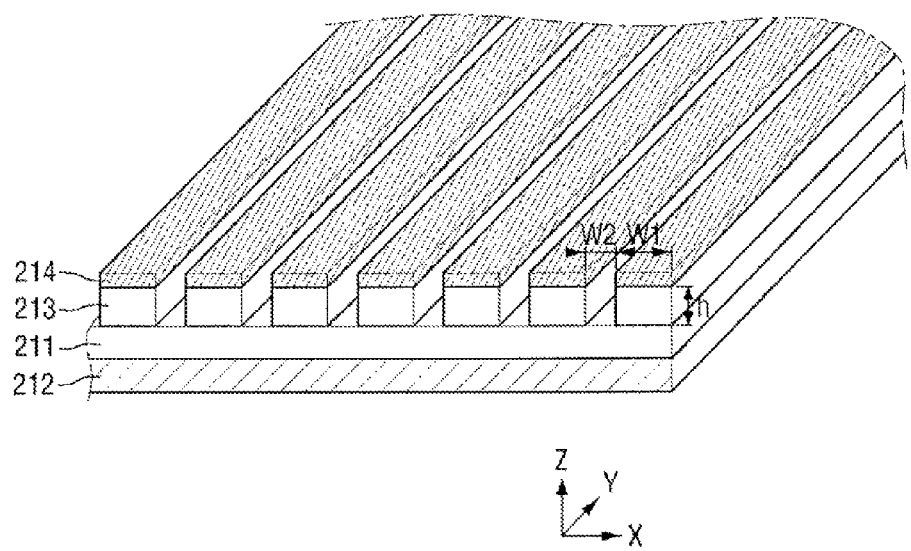
FIG. 4 is a perspective view of a part of a first substrate of a liquid crystal lens panel according to an embodiment of the present disclosure.

FIG. 3 is a partial cross-sectional view of a liquid crystal lens panel 200 according to an embodiment of the present disclosure, and FIG. 4 is a perspective view of a part of a first substrate 210 of a liquid crystal lens panel 200 according to an embodiment of the present disclosure.

Referring to FIGS. 3 and 4, a liquid crystal lens panel 200 according to an embodiment of the present disclosure may include a first base substrate 211, a groove pattern layer 213 disposed on one surface of the first base substrate 211, an alignment electrode layer 214 disposed on the groove pattern layer 213, and a lower common electrode 212 disposed on the other surface of the first base substrate 211.

The groove pattern layer 213 may be a stripe pattern having a plurality of grooves that extend in a direction parallel to one side of the liquid crystal lens panel 200 and are spaced apart in a direction parallel to the other side of the liquid crystal lens panel 200. For example, if the long side of the liquid crystal lens panel 200 corresponds to a horizontal direction of a displayed image, the plurality of grooves that extend in the second direction (y direction of FIG. 4) may be spaced apart in the first direction (x direction of FIG. 4).

The alignment electrode layer 214 may include a plurality of electrode patterns that are separately disposed on an upper portion of the groove pattern layer 213. Different voltages may be applied to at least some adjacent electrode patterns to form electric field profiles in which an electric field perpendicular to the first and second substrates 210 and 220 changes due to voltage differences between adjacent electrode patterns and the common voltage of the upper common electrode 222. This may change the rotation angle of the short pitch cholesteric liquid crystals on upper portions of the adjacent electrode patterns.

For reference, FIG. 3 illustrates that the helical axes of the liquid crystal materials disposed in the ULH structure are aligned in the first direction (x direction) to more easily illustrate the liquid crystal materials aligned in the ULH structure on a cross-sectional view, however, this is exemplary and non-limiting. The helical axes of the uniformly aligned cholesteric liquid crystals may rotate on a plane based on the applied electric field profiles, and this process will be described later with reference to FIGS. 5 and 6.

The voltages applied to the plurality of electrode patterns and the corresponding vertical electric field profiles may periodically repeat in the first direction (x direction). The periodic vertical electric field profiles may implement the optical function that separates the image received from the display panel 100 into a left-eye image and a right-eye image and transmits the separated images in different directions. In some exemplary embodiments, such an optical function may be described as a virtual lenticular lens.

A virtual lenticular lens may be implemented as a virtual Fresnel lens, and in this case, a thin second liquid crystal layer 230 can implement the optical function of the virtual lenticular lens.

Referring again to FIG. 3, to implement a virtual Fresnel lens, a virtual Fresnel lens may be composed of a plurality of zones each of which comprises a plurality of adjacent electrodes that are grouped together. The voltage change of each zone may be repeated for each unit zone. In an embodiment illustrated in FIG. 3, the $(n+1)^{th}$ zone (n+1)th may be a group of four electrode patterns, the $n^{th}$ zone nth may be a group of five electrode patterns, and the $(n-1)^{th}$ zone (n−1)th may be a group of 6 electrode patterns.

That is, in an embodiment of the present disclosure, the width w1 of each of the plurality of electrode patterns is equal to a gap w2 between the electrode patterns, and to provide the respective zones with different sizes so that the electric field profiles formed therefrom may differ from one another, the number of electrode patterns included in the respective zones may differ from each other.

The size of each respective zone may decrease going from the center portion of the virtual Fresnel lens to an adjacent portion of the virtual Fresnel lens, and the number of electrode patterns included in each respective zones may decrease.

For example, the $n^{th}$ zone may include sub-zones sZn1, sZn2, sZn3, sZn4, and sZn5 that correspond to the respective electrode patterns of the $n^{th}$ zone. The voltages of the electrode patterns of sub-zones of one zone may increase or decrease in the second direction.

The width w1 of the electrode pattern and the groove pattern may be, for example, from about 0.1 to about 10 μm, or from about 3 to about 4 μm, and the gap w2 between the electrode patterns and the groove patterns may be, for example, from about 0.1 to about 10 μm, or from about 4 to about 5 μm. The height h of the groove pattern may be, for example, from about 0.1 to about 5 urn or from about 2 to about 3 μm.

In some embodiments, the width w1 of the electrode pattern and the groove pattern and the gap w2 between the electrode patterns and may correspond to integer multiples of the pitch of the short pitch cholesteric liquid crystals, and may be, for example, from about 200 to about 300 nm.

The groove pattern layer 213 may be a silicon nitride layer or an organic layer, and may be formed, for example, by patterning a plate-shaped silicon nitride layer that is laminated on the first base substrate 211 using photoresist technology.

Further, the groove pattern layer 213 may be integrally formed with the alignment electrode layer 214, and may be formed, for example, by laminating the alignment electrode layer 214 on the first base substrate 211 with a thickness that corresponds to the groove pattern and patterning the laminated alignment electrode layer 214 using photoresist technology. In this case, the groove pattern layer 213 may be made of ITO (Indium Tin Oxide) or IZO (Indium Zinc Oxide). Further, in some embodiments, to form a micropattern, the groove pattern layer 213 may be formed using double patterning technology.

Hereinafter, an operation of the liquid crystal lens panel 200 will be described. For clarity of exposition, the following description will focus a part of a plurality of zones that constitute one virtual lenticular lens portion.

Figure 5:
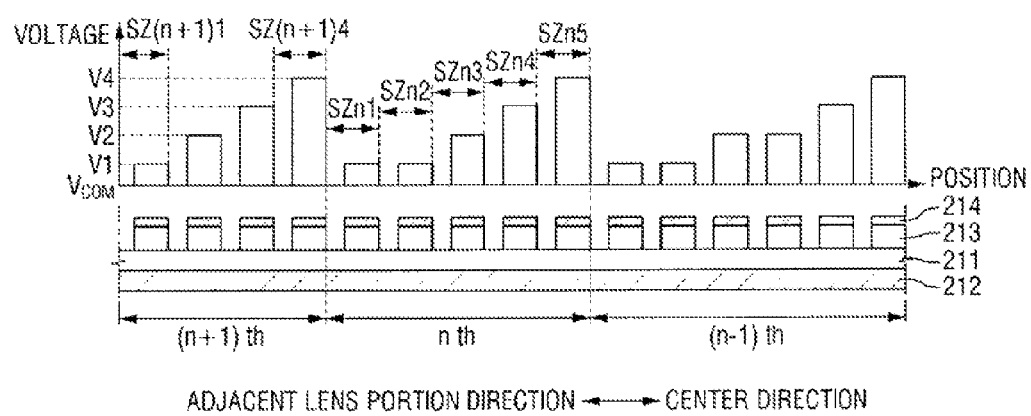
FIG. 5 is a cross-sectional view of a partial zone of one virtual Fresnel lens in association with a graph of voltages applied to a plurality of electrode patterns in a unit zone.
Figure 6:
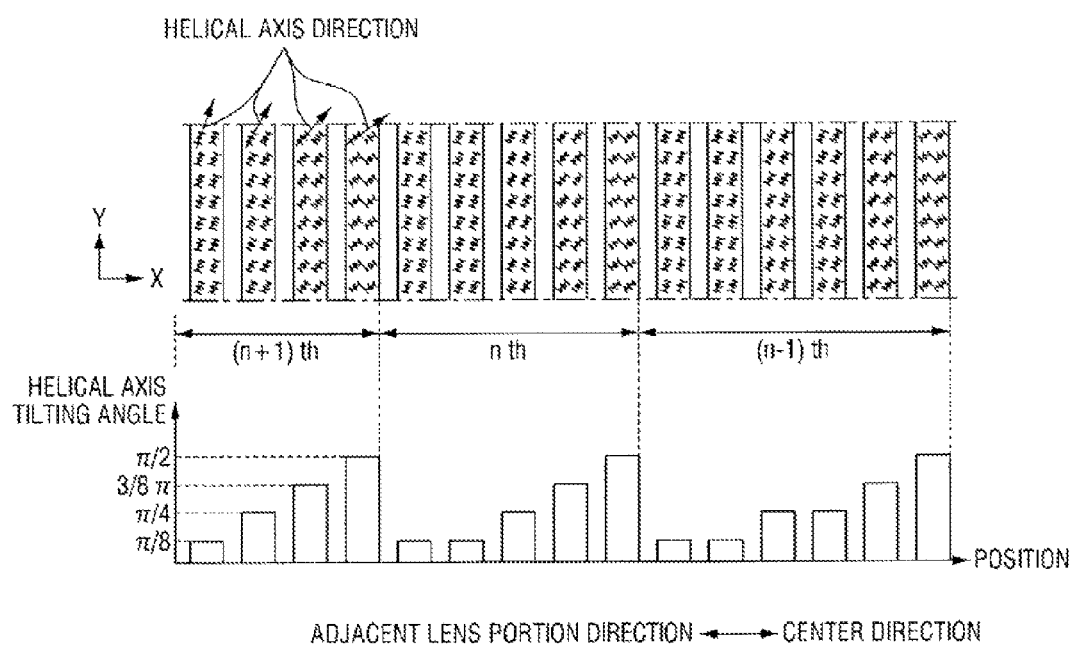
FIG. 6 illustrates the rotational behavior of cholesteric liquid crystals having a uniformly lying helix structure on groove patterns according to voltages applied to a plurality of electrode patterns in the unit zone.

FIG. 5 is a cross-sectional view of a partial zone of one virtual Fresnel lens in association with a graph of voltages applied to a plurality of electrode patterns in a unit zone, and FIG. 6 illustrates the rotational behavior of cholesteric liquid crystals having a uniformly lying helix structure on groove patterns according to voltages applied to a plurality of electrode patterns in the unit zone.

Referring to FIG. 5, in the liquid crystal lens panel 200 according to an embodiment of the present disclosure, different voltages may be applied to the plurality of electrode patterns of the alignment electrode layer 214, and a zone that corresponds to a group of some adjacent electrode patterns may include the electrode patterns to which the different voltages are applied.

Further, the voltage applied to electrode patterns in one zone may increase or decrease toward the adjacent lens portion or in the zone center. Further, voltages applied to at least two adjacent electrode patterns in one zone may be equal to each other. The voltage changes of the respective zones may be repeated for each unit zone.

In FIG. 5, the $(n+1)^{th}$ zone (n+1)th may be a group of four electrode patterns, and the voltages V1, V2, V3, and V4 applied to the electrode patterns of the $(n+1)^{th}$ zone (n+1)th may increase in the direction of the $n^{th}$ zone nth, i.e., toward the center of the virtual Fresnel lens portion.

In addition, the $n^{th}$ zone nth may be a group of five electrode patterns, and the voltage V1 that is applied to the electrode patterns of the first sub-zone sZn1 and the second sub-zone sZn2 of the $n^{th}$ zone nth may be equal to the voltage V1 that is applied to the electrode patterns of the first sub-zone sZ(n+1)1 of the $(n+1)^{th}$ zone (n+1)th. Further, the voltages V2, V3, and V4 that are applied to other electrode patterns of the $n^{th}$ zone nth may increase toward the $(n-1)^{th}$ zone (n-1)th, i.e., toward the center of the virtual Fresnel lens portion, and the voltage V4 that is applied to the electrode patterns of the fifth sub-zone sZn5 of the $n^{th}$ zone nth may be equal to the voltage V4 that is applied to the electrode patterns of the fourth sub-zone sZ(n+1)4 of the $(n+1)^{th}$ zone (n+1)th.

Further, the $(n-1)^{th}$ zone (n-1)th may a group of 6 electrode patterns, and in the same manner as the $(n+1)^{th}$ zone and the $n^{th}$ zone, the voltages that are applied to the electrode patterns may increase toward the center of the virtual Fresnel lens.

The maximum voltage that may be applied to the electrode patterns of each zone may be equal to each other, and the minimum voltage that may be applied to the electrode patterns of each zone may be equal to each other. That is, in an embodiment of the present disclosure, the width w1 of each of the plurality of electrode patterns is equal to the gap w2 between the electrode patterns, and so that the respective zones may have different sizes so that the electric field profiles formed therefrom differ from each other, the number of electrode patterns included in the respective zones may differ from each other. For example, since the number of electrode patterns of the $n^{th}$ zone is greater than the number of electrode patterns of the $(n+1)^{th}$ zone, and the maximum voltage and the minimum voltage applied thereto are equal to each other, the electric field profile formed in the $n^{th}$ zone may increase more slowly than the electric field profile formed in the $(n+1)^{th}$ zone.

Similarly, since the number of electrode patterns of the $(n-1)^{th}$ zone is greater than the number of electrode patterns of the $n^{th}$ zone, the electric field profile formed in the $(n-1)^{th}$ zone may increase more slowly than the electric field profile formed in the $n^{th}$ zone.

The lower common electrode 212 may be disposed on the other surface of the first base substrate 211 to prevent distortion of the electric field between the groove patterns, i.e., between the plurality of electrode patterns. For example, the same voltage may be applied to the upper common electrode 222 and the lower common electrode 212, and thus a reference electric field level $V_{COM}$ may be provided to the region between the plurality of electrode patterns.

Referring to FIG. 6, the cholesteric liquid crystals in the ULH structure on the groove pattern layer 213 may rotate in parallel between the second direction (y direction) and the first direction (x direction).

When the same voltage is applied to both the upper common electrode 222 and the plurality of electrodes and thus no electric field is formed between them, the helical axes of the cholesteric liquid crystals arranged in the ULH structure on the groove pattern layer 213 may align in the second direction (y direction) in which the groove pattern layer extends.

The alignment of the cholesteric liquid crystals arranged in the ULH structure will be described in more detail. A liquid crystal material is injected into the second liquid crystal layer 230, and a chiral dopant is added thereto to form cholesteric liquid crystals having a helical structure. In this case, the helical axes of the cholesteric liquid crystals are arranged in a USH (Uniform Standing Helix) structure in which the helical axes are vertically aligned. This is because the USH structure is more stable in energy than the ULH structure.

Thereafter, the temperature of the second liquid crystal layer 230 is increased until the liquid crystals become isotropic. Here, by maintaining a high-voltage and high-frequency applying state, respective liquid crystal molecules become vertically aligned on the substrate by the dielectric anisotropy of the liquid crystal molecules, and then by slowly decreasing the temperature of the second liquid crystal layer 230 in the high-voltage/high-frequency applying state, the liquid crystal molecules that vertically stand on the substrate are twisted to form ULH structured cholesteric liquid crystals in which the liquid crystals lie on the plane of the substrate.

In this case, the applied voltage may be from about 10 to about 15 V, and the frequency may be about 500 Hz. Further, the temperature of the liquid crystals may be decreased at a rate of about 2° C. per minute.

When the temperature of the second liquid crystal layer 230 is slowly decreased in the high-voltage/high-frequency applying state, the groove pattern, which extends in the second direction (y direction), may favor the direction in which the formed ULH structured cholesteric liquid crystals lie, i.e., in the direction of the helical axis of the cholesteric liquid crystals. For example, a part of the formed ULH structured cholesteric liquid crystals may be aligned in line on the groove pattern in the second direction (y direction), and this may act as a reference alignment structure so that other cholesteric liquid crystals that are subsequently aligned can align in line in the second direction.

That is, the groove pattern and the plurality of electrode patterns formed on the groove pattern according to an embodiment of the present disclosure may provide a reference direction in which the helical axes of the ULH structured cholesteric liquid crystals are arranged on the plane, and may act so that the helical axes of the ULH structured cholesteric liquid crystals align in the second direction in which the groove pattern extends.

Not only structural characteristics, such as thickness and pitch, but also liquid crystal characteristics, such as refractive index, flexoelectric effect, and permittivity of the formed ULH structured cholesteric liquid crystals may change according to the type of liquid crystal compositions that constitute the liquid crystals and the amount of chiral dopant added thereto.

The ULH structured cholesteric liquid crystals may be composed of at least one of a mono-mesogenic liquid crystal with a chiral dopant, a bimesogenic liquid crystal, a banana-shaped liquid crystal, and anisotropic liquid crystal. The chiral dopant content added thereto may be from about 2% to about 30%.

In FIG. 6, the ULH structured cholesteric liquid crystals, which are positioned on the plurality of electrode patterns, may tilt or rotate corresponding to differences between voltages applied to the plurality of electrode patterns and the voltage of the upper common electrode 222. The helical axes of the cholesteric liquid crystals may perform an optical function that corresponds to the optical axis of a birefringent plate with respect to light that passes through the ULH structured cholesteric liquid crystals. Further, since the alignment distribution of the helical axes of the cholesteric liquid crystals on the plurality of electrode patterns of the alignment electrode layer 214 differs corresponding to the voltage profiles of the plurality of electrode patterns, the second liquid crystal layer 230 may perform an optical function that corresponds to a virtual lenticular lens or a virtual Fresnel lens.

FIG. 6 illustrates that as the voltage applied to the plurality of electrode patterns in the unit zone increases from a first voltage to a fourth voltage, the tilt angle or the rotation angle of the helical axes of the cholesteric liquid crystals arranged on the plurality of electrode patterns increases from 0 to $\pi/2$. The first voltage corresponds to a rotation angle of $\pi/8$, the second voltage corresponds to a rotation angle of $\pi/4$, the third voltage corresponds to a rotation angle of $3\pi/8$, and the fourth voltage corresponds to a rotation angle of $\pi/2$.

The short pitch, ULH structured cholesteric liquid crystals, rotate due to flexoelectric effects, which may be caused by splay-bend deformation of the helical structured cholesteric liquid crystals.

The rotational behavior of the short pitch, ULH structured cholesteric liquid crystals due to the flexoelectric effect may be distinguished from the rotational behavior of nematic liquid crystals or smectic liquid crystals based on the strength of the electric field.

The rotational behavior of nematic liquid crystals or smectic liquid crystals is a function of the alignment state of dielectrically anisotropic liquid crystals, which changes to a more stable energy state due to the strength of the electric field. In this case, the entire alignment state should change by a chain reaction in which closely arranged liquid crystals push their neighboring liquid crystals, which results in a slow-speed response.

In contrast, the rotational behavior of the short pitch, ULH structured cholesteric liquid crystals is caused by flexoelectric effects, and thus the ULH structured cholesteric liquid crystals do not rotate to push other cholesteric liquid crystals, and remain in a state in which their shapes are maintained. The rotation of the ULH structured cholesteric liquid crystals corresponds to a state where bending moments due to flexoelectric effects act on cholesteric liquid crystal molecules to rotate the liquid crystal molecules in a plane, which twists the helical axes or optical axes of the cholesteric liquid crystals.

Accordingly, relatively high-speed response characteristics can be expected through the tilting or rotation of the ULH structured cholesteric liquid crystals.

Figure 7:
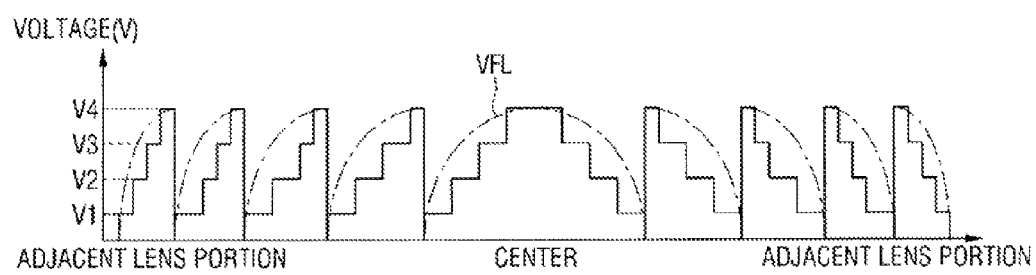
FIG. 7 illustrates zones that constitute one virtual Fresnel lens and voltage distributions of the zones.

FIG. 7 illustrates zones that constitute one virtual Fresnel lens VFL and voltage distributions of the zones.

Referring to FIG. 7, each of the respective zones may include a plurality of electrode patterns to which first to fourth voltages V1, V2, V3 and V4 are applied, and the distribution of the voltages applied to the plurality of electrode patterns may change the tilt or rotation angles of the helical axes of the cholesteric liquid crystals of the second liquid crystal layer 230. Accordingly, the aligned cholesteric liquid crystals can perform an optical function that corresponds to a virtual Fresnel lens.

The optical function of the virtual Fresnel lens or lenticular lens implemented by the liquid crystal lens panel 200 depends on the voltages applied to the plurality of electrode patterns. Accordingly, by adjusting the voltages applied to the plurality of electrode patterns, the size or position of the virtual Fresnel lens or the lenticular lens can be changed, and thus a multi view 3D image can be provided to an observer.

For example, if the liquid crystal lens panel 200 provides two successive virtual Fresnel lenses or lenticular lenses with respect to one frame image received from the display panel 100, the number of 3D image view points that are displayed to the observer may be doubled.

Figure 8:
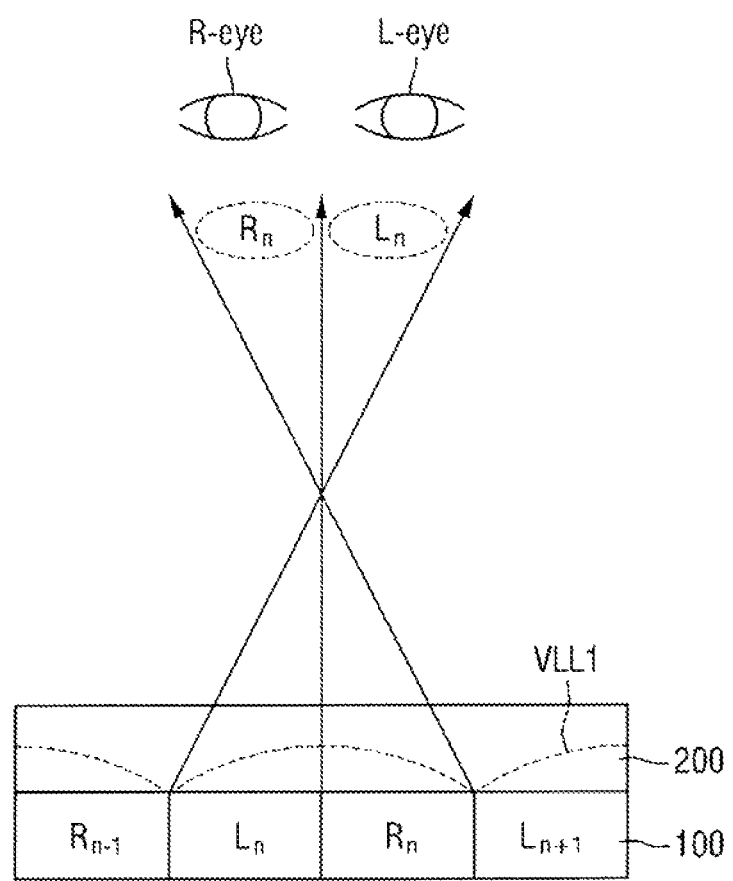
FIG. 8 illustrates an optical path when a liquid crystal lens panel according to an embodiment of the present disclosure implements one lenticular lens.
Figure 9:
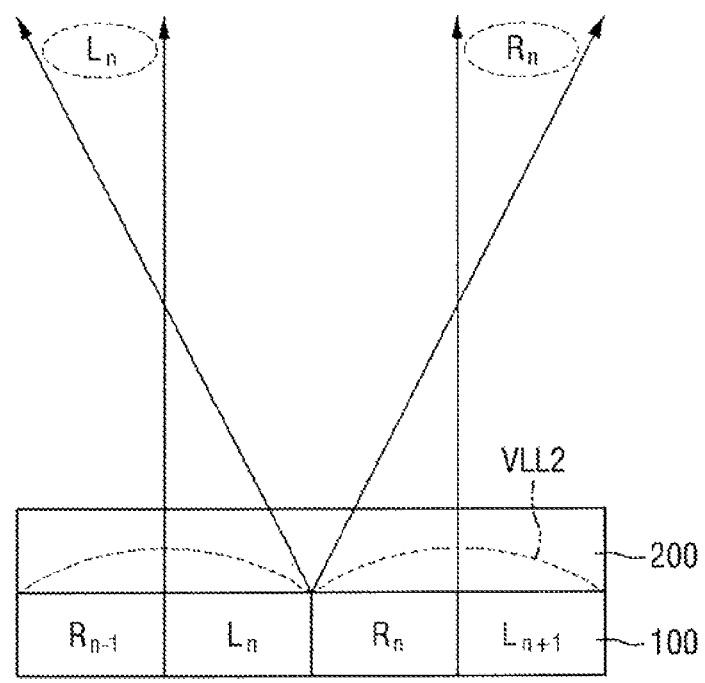
FIG. 9 illustrates an optical path when a liquid crystal lens panel according to an embodiment of the present disclosure implements another lenticular lens.
Figure 10:
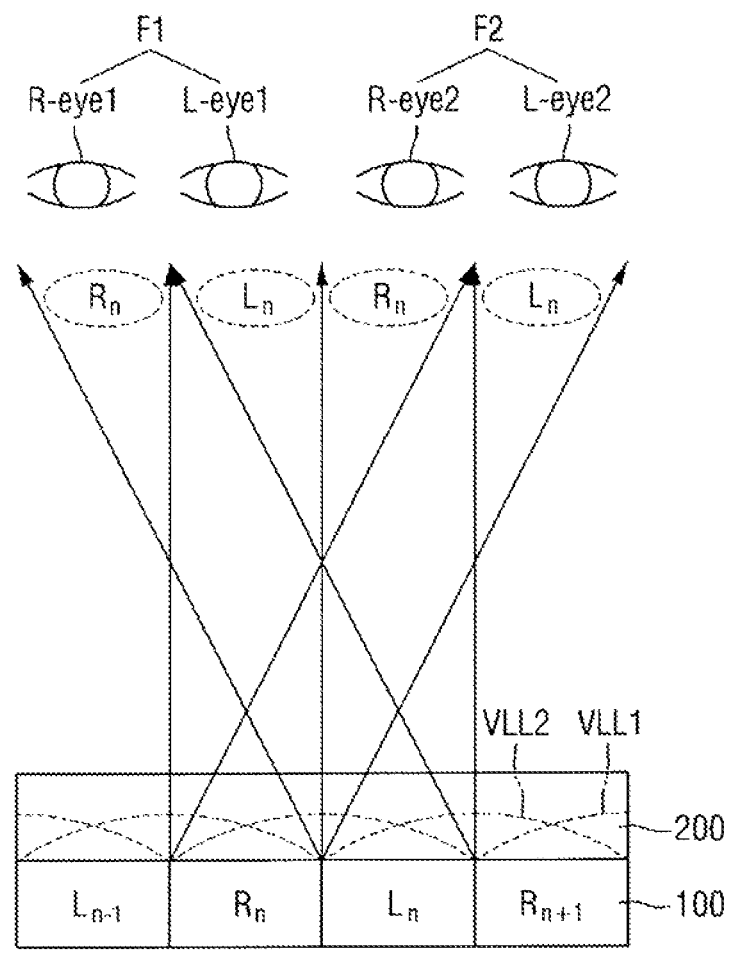
FIG. 10 illustrates an optical path when a liquid crystal lens panel according to an embodiment of the present disclosure increases a number of 3D image view points.

FIG. 8 illustrates an optical path when a liquid crystal lens panel 200 according to an embodiment of the present disclosure implements one lenticular lens, and FIG. 9 illustrates an optical path when a liquid crystal lens panel 200 according to an embodiment of the present disclosure implements another lenticular lens. FIG. 10 illustrates an optical path when a liquid crystal lens panel 200 according to an embodiment of the present disclosure increases the number of 3D image view points.

For convenience in explanation, FIG. 8 illustrates that the liquid crystal lens panel 200 forms a virtual lenticular lens. However, as described above, this illustration is exemplary and non-limiting, and the lens implemented by the second liquid crystal layer 230 may be a virtual Fresnel lens based on the thickness of the second liquid crystal layer 230.

Referring to FIG. 8, the display panel 100 may display a right-eye images Rn and Rn−1 and left-eye images Ln and Ln+1.

The sum of all right-eye images that are displayed by the display panel 100 forms one image, and the sum of all left-eye images forms another image. An observer observes two images that correspond to the right-eye image and the left-eye image through a right eye R_eye and a left eye L_eye, and perceives a 3D image through combination of the two images.

When the observer focuses on the $n^{th}$ right-eye image Rn and the $n^{th}$ left-eye image Ln, the observer can perceive a clear 3D image when a focal length that corresponds to a distance between the left eye L_eye and the right eye R_eye is equal to a distance between the left-eye image Ln and the right-eye image Rn.

As illustrated in FIG. 8, if the liquid crystal lens panel 200 implements one virtual lenticular lens VLL1, the number of focus positions in which the image can be observed to correspond to the focal length of both eyes may be limited to one.

Referring to FIG. 9, the distribution of voltages applied to the plurality of electrode patterns of the alignment electrode layer 214 of the liquid crystal lens panel 200 may change, and a second virtual lenticular lens VLL2 that differs from the first virtual lenticular lens VLL1 illustrated in FIG. 8 may be implemented. FIG. 9 illustrates that the second virtual lenticular lens VLL2 is shifted on a plane by a half period with respect to the first virtual lenticular lens VLL1 illustrated in FIG. 8.

The second virtual lenticular lens LVV2 may refract the left-eye image Ln and the right-eye image Rn to positions that differ from those of the first virtual lenticular lens VLL1.

Referring to FIG. 10, if the liquid crystal lens panel 200 successively implements the first virtual lenticular lens VLL1 and the second virtual lenticular lens VLL2 with respect to one frame image received from the display panel 100, the observer can observe a left-eye image Ln and a right-eye image Rn that are refracted and displayed by the first virtual lenticular lens VLL1 and a left-eye image Ln and a right-eye image Rn that are refracted and displayed by the second virtual lenticular lens VLL2.

When one observer focuses on the $n^{th}$ right-eye image Rn and the $n^{th}$ left-eye image Ln, a first focus position F1 may form in which a focal length that corresponds to a distance between the first left eye L_eye1 and the first right eye R_eye1 is equal to a distance between the left-eye image Ln and the right-eye image Rn.

Further, when another observer focuses on the $n^{th}$ right-eye image Rn and the $n^{th}$ left-eye image Ln, a second focus position F2 may form in which a focal length that corresponds to a distance between the second left eye L_eye2 and the second right eye R_eye2 is equal to the distance between the left-eye image Ln and the right-eye image Rn.

That is, when the liquid crystal lens panel 200 according to an embodiment of the present disclosure forms two types of virtual lenticular lens arrangements with respect to image data of one frame received from the display panel 100, the number of focus positions may double.

Further, if the liquid crystal lens panel 200 implements three or more arrangements of virtual lenticular lens or virtual Fresnel lenses with respect to one frame image of the display panel 100, the number of focus positions in which the observer can perceive a 3D image may increase in proportion to the number of virtual lenticular lenses or virtual Fresnel lenses implemented.

As described above, to increase the number of focus positions of a 3D image by increasing the number of virtual lenticular lenses or virtual Fresnel lenses implemented by a liquid crystal panel, the liquid crystal lens panel 200 includes a liquid crystal material having high-speed response characteristics. In embodiments of the present disclosure, the liquid crystal material includes a ULH structured cholesteric liquid crystals having high-speed response characteristics to realize the above-described virtual lens.

Figure 11:
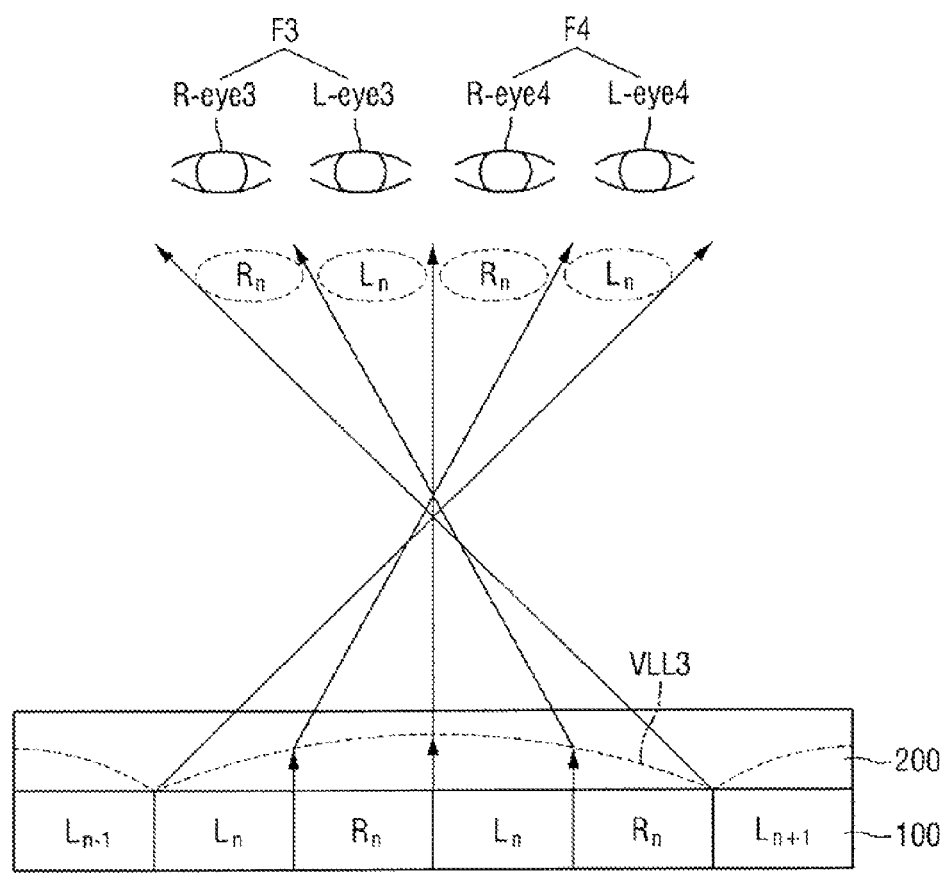
FIG. 11 illustrates an optical path when a liquid crystal lens panel and a display panel according to another embodiment of the present disclosure implement one lenticular lens.
Figure 12:
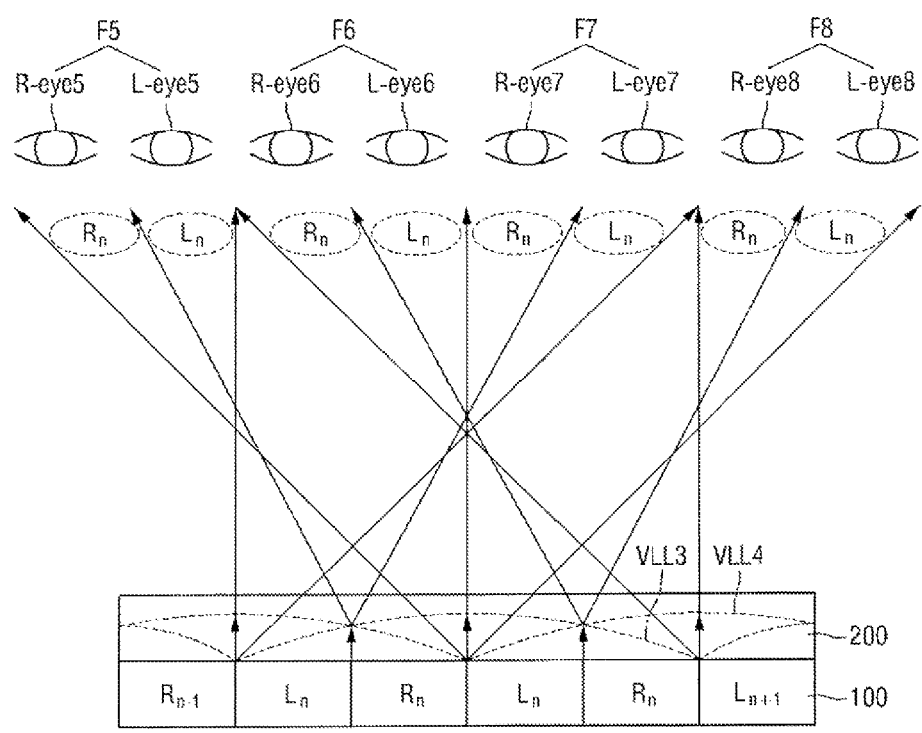
FIG. 12 illustrates an optical path when a liquid crystal lens panel and a display panel according to another embodiment of the present disclosure increase a number of 3D image view points.

FIG. 11 illustrates an optical path when a liquid crystal lens panel 200 and a display panel 100 according to another embodiment of the present disclosure implement one lenticular lens, and FIG. 12 illustrates an optical path when a liquid crystal lens panel 200 and a display panel 100 according to another embodiment of the present disclosure increase a number of 3D image view points.

Referring to FIG. 11, a display panel according to another embodiment of the present disclosure may divide a left-eye image and a right-eye image into two left-eye images and two right-eye images to display the divided images. The sum of one of the two left-eye images forms one image, and the sum of the other of the two left-eye images forms another image. The images that are formed by the two left-eye images may be equal to each other. Similarly, images formed by the two right-eye images may be equal to each other. That is, the two $n^{th}$ left-eye images Ln that are received from the display panel 100 may be equal to each other, and the two $n^{th}$ right-eye images Rn may be equal to each other.

The liquid crystal lens panel 200 may refract the two left-eye images Ln and the two right-eye images Rn received from the display panel 100 and transmit the refracted images in different directions.

When one observer focuses on one $n^{th}$ right-eye image Rn and one $n^{th}$ left-eye image Ln, a third focus position F3 may form in which a focal length that corresponds to a distance between the third left eye L_eye3 and the third right eye R_eye3 is equal to a distance between the one left-eye image Ln and the one right-eye image Rn.

Further, when another observer focuses on the other $n^{th}$ right-eye image Rn and the other $n^{th}$ left-eye image Ln, a fourth focus position F4 may form in which a focal length that corresponds to a distance between the fourth left eye L_eye4 and the fourth right eye R_eye4 is equal to a distance between the other left-eye image Ln and the other right-eye image Rn.

That is, since the display panel 100 emits two left-eye images and two right-eye images in duplicate with respect to one arrangement of a virtual lenticular lens VLL3, two focus positions may be formed.

Further, since the display panel 100 emits three or more left-eye images and three or more right-eye images in duplicate with respect to one arrangement of a virtual lenticular lens VLL3, three or more focus positions may be formed.

Referring to FIG. 12, the display panel 100 may display two left-eye images and two right-eye images in duplicate, and the liquid crystal lens panel 200 may successively implement a third virtual lenticular lens VLL3 and a fourth virtual lenticular lens VLL4 with respect to one frame image that is received from the display panel 100.

An observer may observe two left-eye images Ln and two right-eye images Rn that are refracted and displayed by the third virtual lenticular lens VLL3 and two left-eye images Ln and two right-eye images Rn that are refracted and displayed by the fourth lenticular lens VLL4.

When the observer focuses on the $n^{th}$ right-eye image Rn and the $n^{th}$ left-eye image Ln, fifth to eighth focus positions F5 to F8 may form in which focal lengths that respectively correspond to a distance between the fifth left eye L_eye5 and the fifth right eye R_eye5, a distance between the sixth left eye L_eye6 and the sixth right eye R_eye6, a distance between the seventh left eye L_eye7 and the seventh right eye R_eye7, and a distance between the eighth left eye L_eye8 and the eighth right eye R_eye8 are equal to a distance between the left-eye image Ln and the right-eye image Rn.

That is, since the liquid crystal lens panel 200 according to an embodiment of the present disclosure forms two kinds of lenticular lens arrangements with respect to two left-eye images and two right-eye images in duplicate, four focus positions may be formed.

Further, the number of focus positions in which the observer can perceive a 3D image may increase according to the number of duplicate left-eye images and duplicate right-eye images that are displayed on the display panel 100 and the number of virtual lenticular lenses or virtual Fresnel lenses that are implemented in the liquid crystal lens panel 200.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A liquid crystal lens comprising:
    a first substrate and a second substrate;
    a first common electrode disposed on the first substrate;
    a groove pattern disposed on the second substrate, wherein the groove pattern faces the first substrate;
    a plurality of electrode patterns disposed on the groove pattern;
    a second common electrode formed on a surface of the second substrate opposite to that on which the groove pattern is formed, wherein the second common electrode has a planar shape; and
    a liquid crystal layer interposed between the first substrate and the second substrate,
    wherein the liquid crystal layer includes a uniformly lying helix type liquid crystal material.

2. The liquid crystal lens of claim 1, wherein the uniformly lying helix type liquid crystal material is aligned in a first direction parallel to the first substrate and the second substrate.

3. The liquid crystal lens of claim 1, wherein the groove pattern forms a stripe pattern that are spaced apart in a first direction.

4. The liquid crystal lens of claim 1, wherein the electrode patterns are grouped into a plurality of zones, wherein each zone comprises a plurality of adjacent electrode patterns, a number of electrode patterns included in respective zones differs from each other.

5. The liquid crystal lens of claim 4, wherein a common voltage is applied to the first common electrode, and different voltages are applied to at least some adjacent electrode patterns in each zone to form vertical electric field profiles in which an electric field perpendicular to the first and second substrates changes due to voltage differences between adjacent electrode patterns and the first common electrode.

6. The liquid crystal lens of claim 5, wherein the voltages applied to the plurality of electrode patterns and the corresponding electric field profiles periodically repeat in a first direction for each zone that is parallel to the first substrate and the second substrate, and a period over which the electric field profiles repeat changes in the first direction.

7. The liquid crystal lens of claim 5, wherein a rotation angle of the uniformly lying helix type liquid crystal material changes on a plane that is parallel to the first substrate due to the electric field profiles.

8. The liquid crystal lens of claim 7, wherein the uniformly lying helix type liquid crystal material forms a first virtual Fresnel lens as the rotation angle of the uniformly lying helix type liquid crystal material changes due to the electric field profiles.

9. The liquid crystal lens of claim 8, wherein the voltages applied to the plurality of electrode patterns change with respect to one frame image, wherein the electric field profiles change in the one frame, and the uniformly lying helix type liquid crystal material forms a second virtual Fresnel lens due to the changed electric field profiles.

10. The liquid crystal lens of claim 1, wherein a width of each of the plurality of electrode patterns is equal to a gap between the electrode patterns, and is an integer multiple of a pitch of the uniformly lying helix type liquid crystal material.

11. The liquid crystal lens of claim 1, wherein the groove pattern is a silicon nitride layer or an organic layer.

12. The liquid crystal lens of claim 1, wherein at least one of the plurality of electrode patterns and the groove pattern are integrally formed of the same material.

13. The liquid crystal lens of claim 1, wherein the uniformly lying helix type liquid crystal material is composed of at least one of mono-mesogenic liquid crystals added with chiral dopant, bimesogenic liquid crystals, banana-shaped liquid crystals, and isotropic liquid crystals, and the chiral dopant content added thereto is 2% to 30%.

14. A display device comprising:
    a display panel; and
    a liquid crystal lens disposed on the display panel,
    wherein the liquid crystal lens includes
        a first substrate and a second substrate;
        a first common electrode disposed on the first substrate;
        a groove pattern disposed on the second substrate;
        a second common electrode formed on a surface of the second substrate opposite to that on which the groove pattern is formed, wherein the second common electrode faces away from the first substrate and has a planar shape;
        a plurality of electrode patterns disposed on the groove pattern; and
        a liquid crystal layer interposed between the first substrate and the second substrate, wherein the liquid crystal layer includes a uniformly lying helix type liquid crystal material.

15. A liquid crystal lens comprising:
a first substrate and a second substrate;
a first common electrode formed on the first substrate;
a plurality of electrode patterns formed on the second substrate, wherein the plurality of electrode patterns face the first substrate; and
a liquid crystal layer interposed between the first substrate and the second substrate,
wherein the electrode patterns are grouped into a plurality of zones, wherein each zone comprises a plurality of adjacent electrode patterns, and a number of electrode patterns included in respective zones differs from each other, and
wherein a width of each of the plurality of electrode patterns is equal to a gap between the electrode patterns, and is an integer multiple of a pitch of the uniformly lying helix type liquid crystal material.

16. The liquid crystal lens of claim 15, wherein a common voltage is applied to the first common electrode, and different voltages are applied to at least some adjacent electrode patterns in each zone to form vertical electric field profiles in which an electric field perpendicular to the first and second substrates changes due to voltage differences between adjacent electrode patterns and the first common electrode.

17. The liquid crystal lens of claim 16,
wherein the liquid crystal layer includes a uniformly lying helix type liquid crystal material
wherein a rotation angle of the uniformly lying helix type liquid crystal material changes on a plane that is parallel to the first substrate due to the electric field profiles,
a first virtual Fresnel lens is formed as the rotation angle of the uniformly lying helix type liquid crystal material changes due to the electric field profiles.

18. The liquid crystal lens of claim 17, wherein the voltages applied to the plurality of electrode patterns and the corresponding electric field profiles periodically repeat in a first direction for each zone that is parallel to the first substrate and the second substrate, and a size of each respective zone and a number of electrode patterns included in each respective zone decreases going from a center portion of the first virtual Fresnel lens portion to an adjacent portion of the first virtual Fresnel lens.

19. The liquid crystal lens of claim 17, wherein the voltages applied to the plurality of electrode patterns change with respect to one frame image, wherein the electric field profiles change in the one frame, and the uniformly lying helix type liquid crystal material forms a second virtual Fresnel lens due to the changed electric field profiles.

* * * * *